(12) United States Patent
Cannon et al.

(10) Patent No.: US 8,904,618 B2
(45) Date of Patent: Dec. 9, 2014

(54) METHOD OF TENSIONING PARK BRAKE CABLES

(75) Inventors: Robbie D. Cannon, Clio, MI (US); Karen F. Sieradski, Shelby Township, MI (US); Cheryl A. Garrison, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 13/462,879

(22) Filed: May 3, 2012

(65) Prior Publication Data

US 2013/0291356 A1 Nov. 7, 2013

(51) Int. Cl.
| | |
|---|---|
| *B23P 11/02* | (2006.01) |
| *B23B 11/00* | (2006.01) |
| *B23B 25/00* | (2006.01) |
| *F16D 65/38* | (2006.01) |
| *F16D 65/40* | (2006.01) |
| *F16C 1/22* | (2006.01) |

(52) U.S. Cl.
USPC ........... 29/446; 29/452; 29/407.09; 29/407.1; 81/486; 81/57.38; 188/196 R; 74/501.5 R

(58) Field of Classification Search
CPC ..... B60T 13/746; B60T 7/108; B60T 11/066; B60T 11/043; B60T 11/046; G01L 5/045; G01L 5/102; G01L 5/06; G01L 5/10
USPC .............. 29/446, 452, 407.01, 407.09, 407.1; 81/57.38, 486; 188/196 D, 2 R, 196 R, 188/2 D; 74/502.4, 501.5 R
See application file for complete search history.

(56) References Cited

U.S. PATENT DOCUMENTS

| | | | | |
|---|---|---|---|---|
| 3,943,761 | A * | 3/1976 | Shoberg et al. | 73/862.474 |
| 4,373,402 | A * | 2/1983 | Barrett | 73/862.391 |
| 4,889,007 | A * | 12/1989 | Senft et al. | 74/506 |
| 5,386,887 | A * | 2/1995 | Hilgert et al. | 74/502.4 |
| 5,983,745 | A * | 11/1999 | Petrak | 74/502.4 |
| 6,575,270 | B2 * | 6/2003 | Farenden | 188/2 D |
| 7,331,254 | B2 * | 2/2008 | Petrak | 74/502.4 |
| 7,331,255 | B2 * | 2/2008 | Petrak | 74/502.4 |
| 7,578,216 | B2 | 8/2009 | Sullivan | |
| 7,819,042 | B2 * | 10/2010 | Petrak | 81/57.38 |
| 8,051,745 | B2 | 11/2011 | Petrak | |

(Continued)

FOREIGN PATENT DOCUMENTS

| | | | | |
|---|---|---|---|---|
| JP | 2008001284 A * | 1/2008 | | B60T 17/22 |
| WO | WO 9849037 A2 * | 11/1998 | | B60T 11/04 |
| WO | WO 2009018471 A1 * | 2/2009 | | B60T 13/00 |

*Primary Examiner* — Essama Omgba
(74) *Attorney, Agent, or Firm* — Quinn Law Group, PLLC

(57) ABSTRACT

A method of tensioning park cables of a park brake system includes positioning a tension indicating device between an adjuster and an adjusting nut when the park brake system is disposed in a slack position. The tension indicating device includes an axial spacing length between the adjuster and the adjusting nut that is equal to a desired adjustment distance of the park cables when the park brake system is disposed in the slack position. The adjusting nut is then tightened until the tension indicating device indicates that the park cables include a tension equal to a target tension level of the park cables when the park brake system is disposed in an applied position. The tension indicating device is then removed from between the adjuster and the adjusting nut, thereby introducing slack into the park cables that is equal to the axial length of the tension indicating device.

17 Claims, 3 Drawing Sheets

(56) References Cited

U.S. PATENT DOCUMENTS

| | | | |
|---|---|---|---|
| 8,250,914 B2 * | 8/2012 | Sullivan | 73/121 |
| 2002/0070083 A1 * | 6/2002 | Farenden | 188/2 D |
| 2003/0075001 A1 * | 4/2003 | Petrak | 74/501.5 R |
| 2003/0200818 A1 * | 10/2003 | Adrian | 73/862.391 |
| 2005/0145444 A1 * | 7/2005 | Petrak | 188/2 D |
| 2008/0196552 A1 * | 8/2008 | Petrak | 81/52 |
| 2009/0031868 A1 * | 2/2009 | Petrak | 81/486 |
| 2011/0094347 A1 * | 4/2011 | Petrak | 81/57.38 |
| 2012/0266727 A1 * | 10/2012 | Petrak | 81/57.38 |
| 2013/0283980 A1 * | 10/2013 | Petrak et al. | 81/57 |

* cited by examiner

METHOD OF TENSIONING PARK BRAKE CABLES

TECHNICAL FIELD

The invention generally relates to a park brake system of a vehicle, and more specifically to a method of tensioning park brake cables of the park brake system.

BACKGROUND

Vehicular parking brakes use a cable system to manually engage and release the brakes. The park brake system may include a handle or lever that is coupled to a first end of a first cable. A second end of the first cable is coupled to an adjuster. More specifically, the second end of the first cable extends through an aperture in the adjuster, with an adjusting nut attached to the second end of the first cable to secure the first cable to the adjuster. A left rear cable extends from the adjuster to a left rear brake, and a right rear cable extends from the adjuster to a right rear brake. Tightening the adjusting nut against the adjuster shortens the effective length of the first cable, thereby increasing the tension in the park cables. In contrast, loosening the adjusting nut relative to the adjuster lengthens the effective length of the first cable, thereby decreasing the tension in the park cables.

When the park brake system is actuated, i.e., disposed in an applied position, then the park cables are tensioned to a level sufficient to engage the brakes of the vehicle. When the park brake system is disengaged, slack is introduced into the park cables to reduce the tension in the park cables. Accordingly, when the park brake system is disengaged, the park brake system may be referred to as being in a slack position, and the amount of tension in the cables when disposed in the slack position may be referred to as a target tension level.

The park cables must be properly tensioned to function properly. The lever or handle moves the park cables a pre-defined distance when moving from the slack position to the applied position in order to obtain the requisite tension level in the park cables. If the park cables include excess slack, i.e., if the park cables are too long, then the park brake system will fail to achieve the requisite tension level and will not apply enough force to the brakes to properly engage the brakes. In contrast, if the park cables do not include enough slack, i.e., if the park cables are too short, then the park cables will be excessively tensioned, and will create brake drag, i.e., a continuously applied braking force. Accordingly, the tension of the park cables, i.e., the length of the park cables when in the slack position, must be properly set to the target tension level in order for the park brake system to function properly.

SUMMARY

A method of tensioning a park brake system of a vehicle is provided. The method includes positioning a tension indicating device between an adjuster and an adjusting nut of the park brake system when the park brake system is disposed in a slack position. The tension indicating device includes an axial spacing length between the adjuster and the adjusting nut that is equal to a desired adjustment distance of a plurality of park cables of the park brake system when the park brake system is disposed in the slack position. The tension indicating device is positioned between the adjuster and the adjusting nut to remove slack from the park cables without applying the park brake system. The adjusting nut is then tightened until the tension indicating device indicates that the park cables include a tension equal to a target tension level of the park cables. When the park cables are tensioned at the target tension level, the position of the adjusting nut is defined as an index position of the adjusting nut. The tension indicating device is then removed from between the adjuster and the adjusting nut, thereby introducing slack into the park cables that is equal to the axial length of the tension indicating device.

In another embodiment, a method of tensioning a plurality of park cables of a park brake system includes spacing an adjusting nut from an adjuster when the park brake system is in a slack position. The adjusting nut is spaced from the adjuster a distance equal to a desired adjustment distance in the park cables when the park brake system is in the slack position to remove slack from the park brake system. The park cables are then tensioned while the adjusting nut is spaced from the adjuster and the park brake system is disposed in the slack position. The park cables are tensioned until a tension indication device indicates that the park cables exhibit a tension equal to a target tension level of the park cables. Release of the adjusting nut to remove the space between the adjuster and the adjusting nut introduces the desired adjustment distance back into the park cables when the park brake system is in the slack position.

Accordingly, placing the tension indicating device between the adjuster and the adjusting nut removes an amount of slack from the park cables that is equal to the amount of slack that is removed when the park brake system is engaged, thereby simulating engagement of the park brake system without actually engaging the park brake system. With the appropriate amount of slack removed from the park cables, the park cables may then be properly tensioned to the target tension level by tightening the adjusting nut to shorten an effective overall length of the park cables. Once the park cables are properly tensioned to the target tension level, then the tension indicating device is removed, thereby introducing the appropriate amount of slack back into the park cables.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
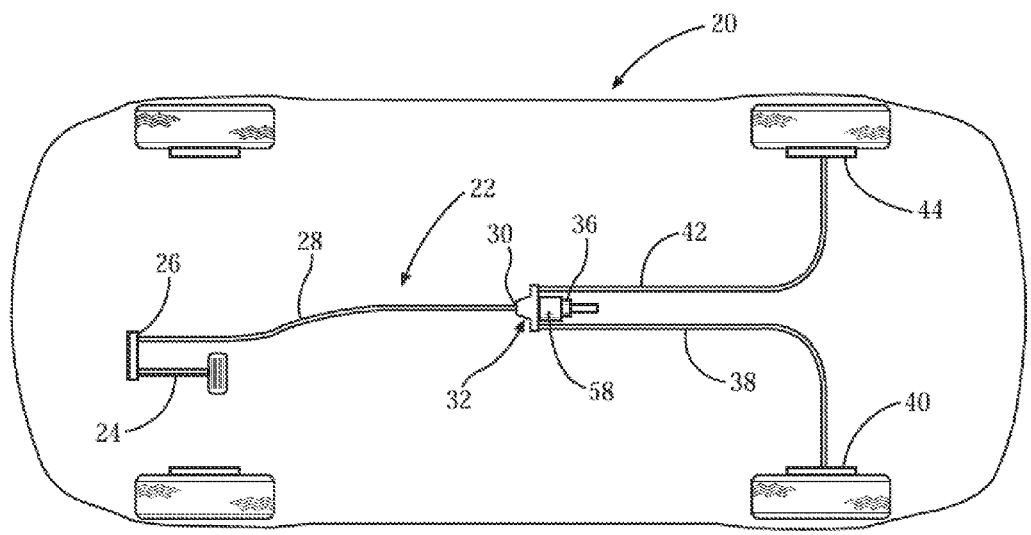
FIG. 1 is a schematic plan view of a vehicle showing a park brake system.

Referring to the Figures, wherein like numerals indicate like parts throughout the several views, a vehicle is generally shown at 20 in FIG. 1. Referring to FIG. 1, the vehicle 20 includes a park brake system 22 using a series of park cables to manually engage and release brakes of the vehicle 20. The park brake system 22 may include an actuation lever 24, such as but not limited to a hand lever or a foot pedal, that is coupled to a first end 26 of a first cable 28. A second end 30 of the first cable 28 is coupled to an adjuster 32. More specifically, the second end 30 of the first cable 28 extends through an aperture in the adjuster 32, with an adjusting nut 36 attached to the second end 30 of the first cable 28 to secure the first cable 28 relative to the adjuster 32. A left rear cable 38 extends from the adjuster 32 to a left rear brake 40, and a right rear cable 42 extends from the adjuster 32 to a right rear brake 44. As used herein, the term park cables include the first cable 28, the right rear cable 42 and the left rear cable 38. However, it should be appreciated that different configurations of the park brake system 22 may include a greater number of cables or a fewer number of cables, and that the term park cables may include more than or less than the three cables described above. Tightening the adjusting nut 36 against the adjuster 32 shortens an effective length of the first cable 28, i.e., the length between the actuation lever 24 and the adjuster 32, thereby shortening the length of the cable system between the actuation lever 24 and the left and right rear brakes 40, 44, which increases the tension in the park cables 28, 38, 42. In contrast, loosening the adjusting nut 36 relative to the adjuster 32 lengthens the effective length of the first cable 28, thereby lengthening the length of the cable system between the actuation lever 24 and the left and right rear brakes 40, 44, which decreases the tension in the park cables 28, 38, 42.

When the park brake system 22 is actuated, i.e., moved into an applied position, then the park cables 28, 38, 42 are ideally tensioned to a tension level sufficient to properly engage both the right rear brake 44 and the left rear brake 40 of the vehicle 20. When the park brake system 22 is disengaged, i.e., when the actuation lever 24 is released, slack is introduced into the park cables 28, 38, 42 to reduce the tension in the park cables 28, 38, 42 and disengage both the left rear brake 40 and the right rear brake 44. As such, when the park brake system 22 is disengaged, the park brake system 22 may be referred to as being in a slack position, and the amount of tension in the park cables 28, 38, 42 may be referred to as a target tension level.

A method of tensioning the park cables 28, 38, 42 to the target tension level without applying the park brake system 22 is provided. The target tension level of the park cables 28, 38, 42 is the desired amount of tension in the park cables 28, 38, 42 when the park cables 28, 38, 42 are disposed in the slack position, i.e., the un-applied position. Accordingly, when actuated into an applied position, the park cables 28, 38, 42 should be tensioned to a tension level that is greater than the target tension level and sufficient to properly engage the left rear brake 40 and the right rear brake 44.

Figure 2:
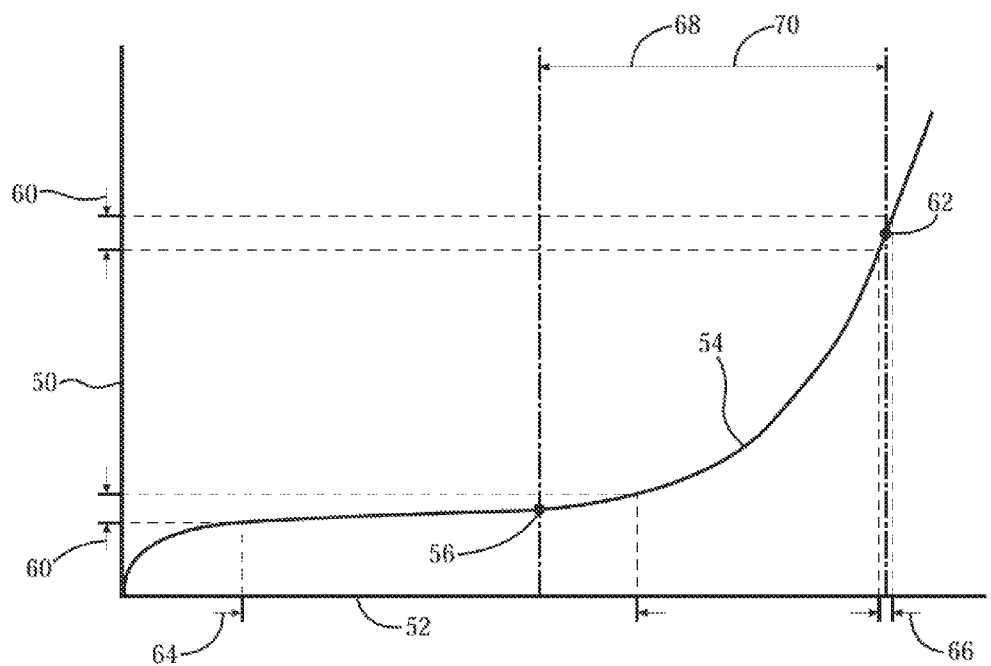
FIG. 2 is a graph showing the relationship between tension in park cables of the park brake system vs. adjustment distance of the park cables.

Referring to FIG. 2, a graph is shown representing the relationship between tension and adjustment distance of the park cables 28, 38, 42 of the park brake system 22. As shown in FIG. 2, the tension of the park cables 28, 38, 42 is generally indicated along a vertical axis 50, and the adjustment distance of the park cables 28, 38, 42 is generally indicated along a horizontal axis 52. The cable tension of the park cables 28, 38, 42 of the park brake system 22 is generally indicated by the line 54, with the target tension level generally indicated by the reference dot 56. The cable tension 54 in the park cables 28, 38, 42 is measured with a tension indicating device 58, which is best shown in FIGS. 3 through 6 and described in greater detail below. The tension indicating device 58 senses the cable tension 54 within a defined range or variance. This variance of the tension indicating device 58 is generally represented by the range indicated by reference numeral 60.

FIG. 2 shows the variance 60 in the tension indicating device 58 associated with measuring the cable tension 54 at the target tension level 56, and also shows the variance 60 in the tension indicating device 58 associated with measuring the cable tension 54 at an offset tension level, generally indicated by the reference dot 62. Because the slope of the cable tension 54 of the park cables 28, 38, 42 is generally flat in the region bounding the target tension level 56, the variance 60 in the tension indicating device 58 provides for a large adjustment length, generally indicated at 64. Attempting to adjust the length of the park cables 28, 38, 42 to the target tension level 56 directly with the variance 60 associated with the tension indicating device 58 may result in the length of the park cables 28, 38, 42 being anywhere within the large adjustment length 64. Because the slope of the cable tension 54 of the park cables 28, 38, 42 extends at a substantially vertical rate in the region bounding the offset tension level 62, the variance 60 in the tension indicating device 58 provides for a small adjustment length, generally indicated at 66. Adjusting the length of the park cables 28, 38, 42 to the offset tension level 62 directly with the variance 60 associated with the tension indicating device 58 may result in the length of the park cables 28, 38, 42 being anywhere within the small adjustment length 66. As such, adjusting the length of the park cables 28, 38, 42 to obtain the offset tension level 62 is much more precise than adjusting the length of the park cables 28, 38, 42 to obtain the target tension level 56. Once the length of the park cables 28, 38, 42 is adjusted to be within the small adjustment length 66 associated with the offset tension level 62, the length of the park cables 28, 38, 42 may then be adjusted by a desired adjustment distance, generally indicted at 68, which relates the offset tension level 62 to the target tension level 56, i.e., the difference in the length of the park cables 28, 38, 42 between the offset tension level 62 and the target tension level 56, thereby transferring the more precise setting of the offset tension level 62 to the target tension level 56.

Accordingly, the method utilizes the strategy described above to set the tension of the park cables 28, 38, 42 when at a high tension level to minimize the effect of the variance 60 in the tension indicating tool, and then adjust the length of the park cables 28, 38, 42 by the desired adjustment distance 68 to achieve the target tension level 56 when the park cables 28, 38, 42 are disposed in the slack position, i.e., un-applied.

The method includes defining the desired adjustment distance 68 for the park cables 28, 38, 42 of the park brake system 22. The desired adjustment distance 68 is the difference in the length of the park cables 28, 38, 42 between the target tension level 56 and the offset tension level 62. Both the target tension level 56 and the offset tension level 62 are dependent upon the specific park brake system 22 and/or vehicle 20, and as such may be defined to any suitable values. The desired adjustment distance 68 is the numerical difference in the length of the park cables 28, 38, 42 when at the target tension level 56 and the length of the park cables 28, 38, 42 when at the offset tension level 62.

Referring to FIG. 2, the adjusting nut 36 is then spaced from the adjuster 32 when the park brake system 22 is disposed in the slack position. The adjusting nut 36 is spaced from the adjuster 32 a distance equal to the desired adjustment distance 68 to remove slack from the park brake system 22. Spacing the adjusting nut 36 from the adjuster 32 may include, but is not limited to, providing the tension indicating device 58 having an axial spacing length 70 measured along a centerline of the first park cable that is substantially equal to the desired adjustment distance 68. The tension indicating device 58 is then positioned between the adjuster 32 and the adjusting nut 36 of the park brake system 22 when the park brake system 22 is disposed in a slack position.

The park cables 28, 38, 42 are then tensioned while the adjusting nut 36 is spaced from the adjuster 32 and the park brake system 22 is disposed in the slack position. The park cables 28, 38, 42 are tensioned until the tension indicating device 58 indicates that the park cables 28, 38, 42 include a tension equal to the offset tension level 62. Release of the adjusting nut 36 to remove the space between the adjuster 32 and the adjusting nut 36 introduces the desired adjustment distance 68 back into the park cables 28, 38, 42, and thereby reduces the tension in the park cables 28, 38, 42 down to the target tension level 56.

The park cables 28, 38, 42 may be tensioned by tightening the adjusting nut 36 against the tension indicating device 58, thereby shortening the length of the first cable 28 and increasing the tension in the park cables 28, 38, 42. The adjusting nut 36 is tightened until the tension indicating device 58 indicates that the park cables 28, 38, 42 include a tension equal to the offset tension level 62. The position of the adjusting nut 36 relative to the first cable 28 when the park cables 28, 38, 42 are tensioned to the offset tension level 62 may be defined as an index position of the adjusting nut 36. The adjusting nut 36 may be tightened to shorten the length of the first cable 28 in any suitable manner, and will depend upon the specific configuration and interlocking engagement between the first cable 28 and the adjusting nut 36.

Once the adjusting nut 36 is tightened to the index position and the park cables 28, 38, 42 are tensioned to the offset tension level 62, the tension indicating device 58 is then removed from between the adjuster 32 and the adjusting nut 36. Removing the tension indicating device 58 introduces slack back into the park cables 28, 38, 42 that is equal to the axial spacing length 70 of the tension indicating device 58, which reduces the tension in the park cables 28, 38, 42 to the target tension level 56.

The disclosed method is suitable for use during assembly of the vehicle 20, after the park brake system 22 has been installed on the vehicle 20. As such, the tension indicating device 58 may include a slot 72 configured to receive the first cable 28 therein and extending the axial spacing length 70 of the tension indicating device 58. The tension indicating device 58 may be radially inserted over the first cable 28 until the tension indicating device 58 is disposed radially about the centerline of the first cable 28 between the adjustor and the adjusting nut 36. The tension indicating device 58 is removed by withdrawing the tension indicating device 58 from the first cable 28 in a direction transverse to the centerline of the first cable 28. The tension indicating device 58 may be equipped with roller bearings disposed at axial ends thereof for engaging the adjuster 32 and the adjusting nut 36 respectively, thereby easing withdrawal of the tension indicating device 58. Alternatively, the tension indicating device 58 may be removed by loosening the adjusting nut 36 a defined distance prior to withdrawing the tension indicating device 58 from the first cable 28, withdrawing the tension indicating device 58 from about the first cable 28, and then tightening the adjusting nut 36 the defined distance after withdrawing the tension indicating device 58 from the first cable 28 to return the adjusting nut 36 to the index position of the adjusting nut 36.

Figure 3:
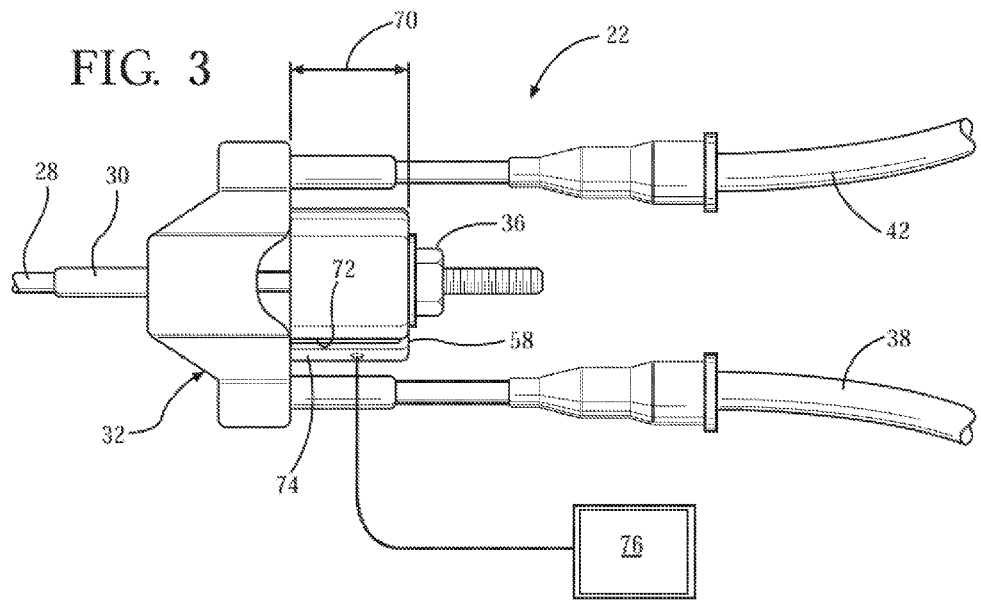
FIG. 3 is a schematic fragmentary plan view of the park brake system.

The tension indicating device 58 may include any device capable of measuring the tension of the park cables 28, 38, 42 and indicating that the tension of the park cables 28, 38, 42 has reached the offset tension level 62. For example and as shown in FIG. 3, the tension indicating device 58 may include an electronic load cell 74. The electronic load cell 74 measures the tension in the park cables 28, 38, 42 and provides a signal to a display 76 that outputs the cable tension 54, such as by displaying a numeric value of the cable tension 54.

Figure 4:
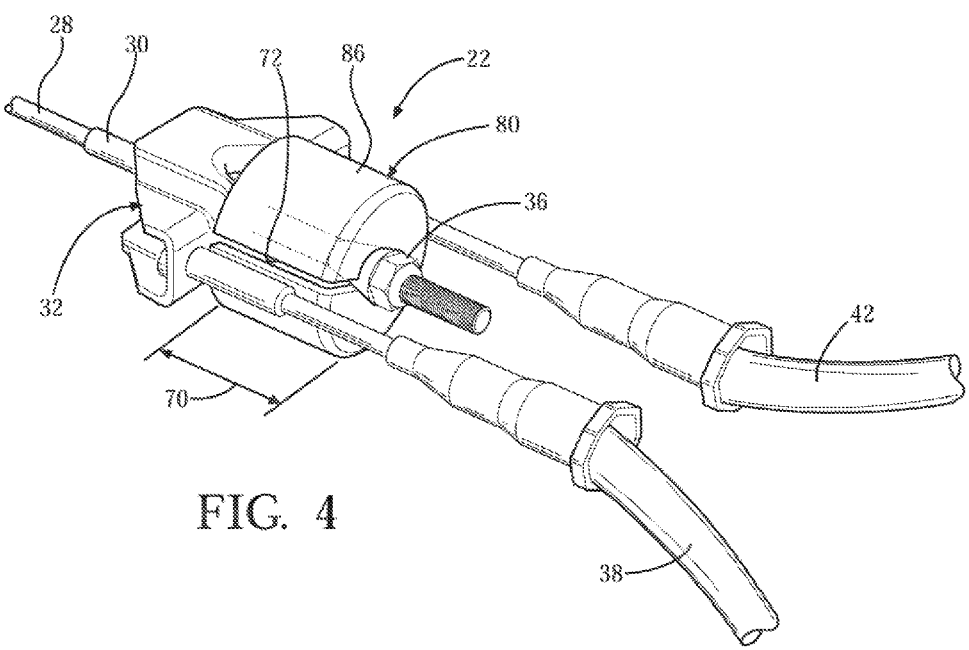
FIG. 4 is a schematic fragmentary perspective view of the park brake system showing a first embodiment of a mechanical tension indicating tool.
Figure 5:
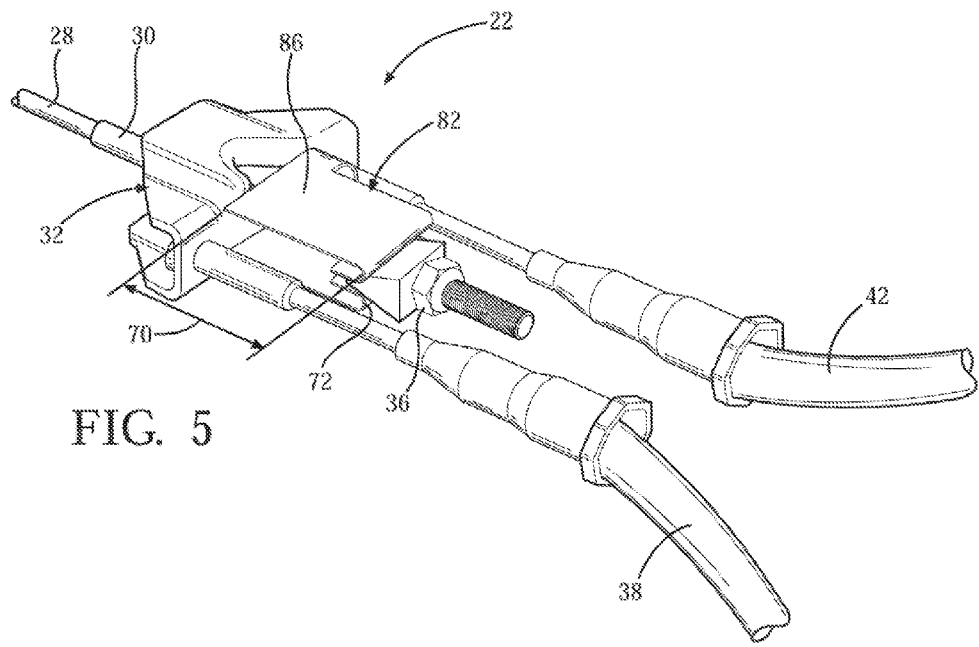
FIG. 5 is a schematic fragmentary perspective view of the park brake system showing a second embodiment of the mechanical tension indicating tool.
Figure 6:
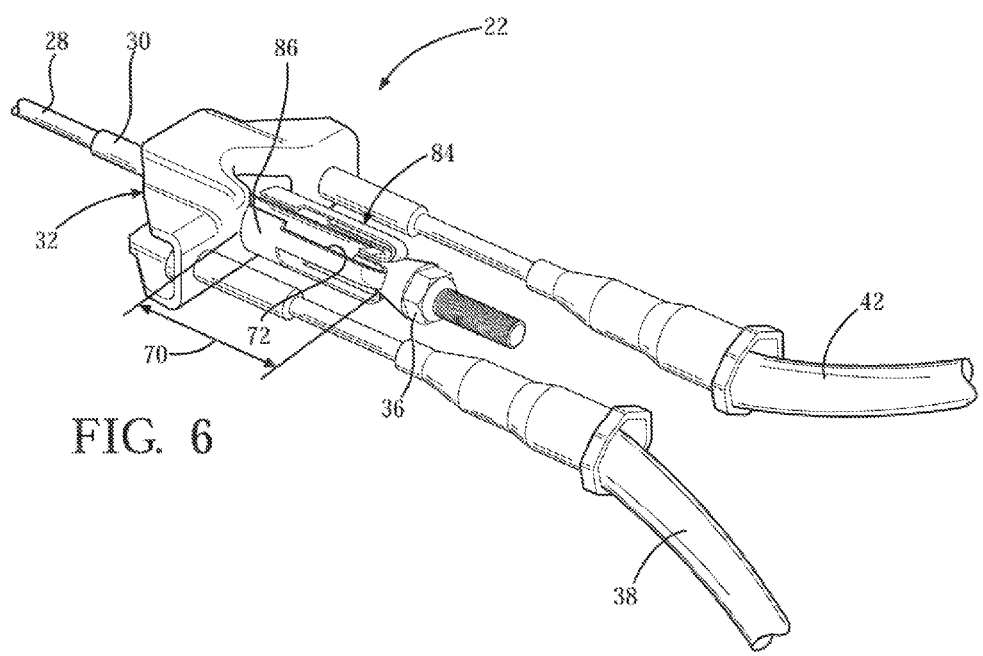
FIG. 6 is a schematic fragmentary perspective view of the park brake system showing a third embodiment of the mechanical tension indicating tool.

Alternatively, referring to FIGS. 4 through 6, the tension indicating device 58 may include a mechanical tension indicating tool. Each of FIGS. 4 through 6 shows a different embodiment of a mechanical tension indicating tool. FIG. 4 shows a first embodiment of the mechanical tension indicating tool at 80, FIG. 5 shows a second embodiment of the mechanical tension indicating tool at 82, and FIG. 6 shows a third embodiment of the mechanical tension indicating tool at 84. The adjusting nut 36 is tightened against the mechanical tension indicating tool 80, 82, 84 until the mechanical tension indicating tool 80, 82, 84 yields and releases the adjusting nut 36.

The mechanical tension indicating tool 80, 82, 84 includes a body portion 86 configured to restrain the adjusting nut 36 a distance from the adjuster 32 equal to the axial spacing length 70. The mechanical tension indicating tool 80, 82, 84 restrains the adjusting nut 36 until the park cables 28, 38, 42 reach the offset tension level 62. When the mechanical tension indicating tool 80, 82, 84 reaches the offset tension level 62, the body portion 86 yields, expands, or spreads open to allow the adjusting nut 36 to pass therethrough. Accordingly, the body portion 86 of the mechanical tension indicating tool 80, 82, 84 is configured to yield at the offset tension level 62. As the adjusting nut 36 is tightened against the body portion 86 of the mechanical tension indicating tool 80, 82, 84, the adjusting nut 36 compresses the body portion 86 of the mechanical tension indicating tool 80, 82, 84 between the adjuster 32 and the adjusting nut 36, thereby generating a compressive force. Upon the compressive force reaching a level associated with the offset tension level 62 of the park cables 28, 38, 42, the body portion 86 yields and expands radially to release the adjustor nut. The mechanical tension indicating tool 80, 82, 84 yields upon the tension in the park cables 28, 38, 42 reaching the offset tension level 62 without fracturing or permanently deforming, thereby allowing for the mechanical tension indicating tool 80, 82, 84 to be reused, and without creating any debris.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of tensioning a park brake system of a vehicle, the method comprising:

positioning a tension indicating device between an adjuster and an adjusting nut of the park brake system when the park brake system is disposed in a slack position to remove slack from a plurality of park cables of the park brake system without applying the park brake system, wherein the tension indicating device includes an axial spacing length between the adjuster and the adjusting nut that is equal to a desired adjustment distance of the park cables;

tightening the adjusting nut until the tension indicating device indicates that the park cables include a tension equal to an offset tension level to define an index position of the adjusting nut; and removing the tension indicating device from between the adjuster and the adjusting nut, thereby introducing slack into the park cables equal to the axial length of the tension indicating device to reduce the tension in the park cables to a target tension level;

wherein the tension indicating device includes a mechanical tension indicating tool, and wherein tightening the adjusting nut until the tension indicating device indicates that the park cables include a tension equal to the offset tension level includes tightening the adjusting nut until the mechanical tension indicating tool yields and releases the adjusting nut; and wherein the mechanical tension indicating tool includes a body portion configured to restrain the adjusting nut a distance from the adjuster equal to the axial spacing length until the park cables reach the offset tension level, and wherein tightening the adjusting nut until the mechanical tension indicating tool yields is further defined as tightening the adjusting nut to compress the body portion of the mechanical tension indicating tool between the adjuster and the adjusting nut until the body portion expands radially to release the adjustor nut.

2. A method as set forth in claim 1 further comprising defining the desired adjustment distance for the park cables of the park brake system.

3. A method as set forth in claim 2 further comprising providing a tension indicating device having an axial spacing length measured along a centerline of a first park cable that is substantially equal to the desired adjustment distance.

4. A method as set forth in claim 1 wherein the tension indicating device includes an electronic load cell, and wherein tightening the adjusting nut until the tension indicating device indicates that the park cables include a tension equal to the offset tension level includes tightening the adjusting nut until the electronic load cell signals that the offset tension level has been achieved.

5. A method as set forth in claim 1 wherein the mechanical tension indicating tool yields upon the tension in the park cables reaching the offset tension level without fracturing or permanently deforming.

6. A method as set forth in claim 1 wherein positioning the tension indicating device between the adjuster and the adjusting nut is further defined as positioning the tension indicating device radially about a first cable between the adjustor and the adjusting nut.

7. A method as set forth in claim 6 wherein removing the tension indicating device includes withdrawing the tension indicating device from the first cable in a direction transverse to a centerline of the first cable.

8. A method as set forth in claim 7 wherein removing the tension indicating device includes loosening the adjusting nut a defined distance prior to withdrawing the tension indicating device from the first cable.

9. A method as set forth in claim 8 wherein removing the tension indicating device includes tightening the adjusting nut the defined distance after withdrawing the tension indicating device from the first cable to return the adjusting nut to the index position of the adjusting nut.

10. A method as set forth in claim 1 wherein the park cables are tensioned to the target tension level without applying the park brake system.

11. A method of tensioning a plurality of park cables of a park brake system having an adjuster and an adjusting nut, the method comprising:

spacing the adjusting nut from the adjuster with a mechanical tension indicating tool a distance equal to a desired adjustment distance in the park cables when the park brake system is in the slack position to remove slack from the park brake system, wherein the mechanical tension indicating tool includes a body portion configured to restrain the adjusting nut from the adjuster the distance equal to the desired adjustment distance until the park cables reach an offset tension level; and tensioning the park cables, by tightening the adjusting nut against the mechanical tension indicating tool, while the adjusting nut is spaced from the adjuster and the park brake system is disposed in the slack position, to compress the body portion of the mechanical tension indicating tool between the adjuster and the adjusting nut until the body portion expands radially and releases the adjustor nut, thereby indicating that the park cables exhibit a tension equal to the offset tension level of the park cables, whereupon release of the adjusting nut to remove the space between the adjuster and the adjusting nut introduces the desired adjustment distance into the park cables to reduce the tension in the park cables to a target tension level.

12. A method as set forth in claim 11 wherein spacing the adjusting nut from the adjuster includes positioning a tension indicating device between the adjuster and the adjusting nut when the park brake system is disposed in the slack position to remove slack from the park cables without applying the park brake system, wherein the tension indicating device includes an axial spacing length between the adjuster and the adjusting nut that is equal to the desired adjustment distance of the park cables.

13. A method as set forth in claim 12 wherein positioning the tension indicating device between the adjuster and the adjusting nut is further defined as positioning the tension indicating device radially about a first cable between the adjustor and the adjusting nut.

14. A method as set forth in claim 13 further comprising removing the tension indicating device from between the adjuster and the adjusting nut after the park cables are tensioned to the offset tension level.

15. A method as set forth in claim 14 wherein removing the tension indicating device includes withdrawing the tension indicating device from the first cable in a direction transverse to a centerline of the first cable.

16. A method as set forth in claim 12 wherein tensioning the park cables is further defined as tightening the adjusting nut to compress the tension indicating device between the adjuster and the adjusting nut.

17. A method as set forth in claim 11 wherein the park cables are tensioned to the target tension level without applying the park brake system.

* * * * *